(12) United States Patent
Zeng et al.

(10) Patent No.: US 10,690,951 B2
(45) Date of Patent: Jun. 23, 2020

(54) DISPLAY PANEL, DISPLAY DEVICE AND DRIVING METHOD OF DISPLAY PANEL

(71) Applicant: Chengdu Tianma Micro-Electronics Co., Ltd., Chengdu (CN)

(72) Inventors: Guobo Zeng, Chengdu (CN); Shoufu Jian, Shanghai (CN); Fei Chen, Chengdu (CN); Dongquan Hou, Chengdu (CN)

(73) Assignee: CHENGDU TIANMA MICRO-ELECTRONICS CO., LTD., Chengdu (CN)

( * ) Notice: Subject to any disclaimer, the term of this patent is extended or adjusted under 35 U.S.C. 154(b) by 35 days.

(21) Appl. No.: 15/730,636

(22) Filed: Oct. 11, 2017

(65) Prior Publication Data

US 2019/0004355 A1  Jan. 3, 2019

(30) Foreign Application Priority Data

Jun. 29, 2017 (CN) .......................... 2017 1 0516499

(51) Int. Cl.
*G02F 1/1333* (2006.01)
*G06F 3/041* (2006.01)
*G02F 1/1343* (2006.01)
*G06F 3/044* (2006.01)

(52) U.S. Cl.
CPC ........ *G02F 1/13338* (2013.01); *G02F 1/1343* (2013.01); *G06F 3/044* (2013.01); *G06F 3/0412* (2013.01); *G06F 3/0416* (2013.01)

(58) Field of Classification Search
CPC .. G06F 3/0416; G06F 3/0412; G02F 1/13338; G02F 1/1343
See application file for complete search history.

(56) References Cited

U.S. PATENT DOCUMENTS

| 9,785,283 | B2* | 10/2017 | Noguchi | ............... G06F 3/0412 |
| 2010/0073325 | A1* | 3/2010 | Yang | ...................... G06F 3/044 345/174 |
| 2014/0313157 | A1* | 10/2014 | Ahn | ...................... G06F 3/044 345/174 |

(Continued)

FOREIGN PATENT DOCUMENTS

| CN | 104317467 A | 1/2015 |
| CN | 105094492 A | 11/2015 |

*Primary Examiner* — Benyam Ketema
(74) *Attorney, Agent, or Firm* — Alston & Bird LLP

(57) ABSTRACT

A display panel, a display device and a driving method of the display panel are provided. The display panel includes: a plurality of touch electrodes; a plurality of control units; switching units. Each switching unit and one of the control units are arranged to be associated with each other. Each switching unit is associated with one of the touch electrodes. Each control unit has a first and a second triggering signal input terminal, different gate driving signals are input to the first and the second triggering signal input terminal respectively. Each control unit is configured to output a control signal to an associated switching unit according to the gate driving signals input to the first and the second triggering signal input terminal. The associated switching unit is configured to output a touch signal to the associated one of the touch electrodes according to the control signal.

11 Claims, 13 Drawing Sheets

(56) References Cited

U.S. PATENT DOCUMENTS

| | | | |
|---|---|---|---|
| 2015/0062062 A1* | 3/2015 | Han | G06F 3/0412 |
| | | | 345/174 |
| 2016/0188062 A1* | 6/2016 | Jung | G06F 3/0412 |
| | | | 345/173 |
| 2017/0003815 A1* | 1/2017 | Xi | G06F 3/0416 |
| 2017/0315671 A1* | 11/2017 | Suzuki | G06F 3/0412 |
| 2018/0095583 A1* | 4/2018 | Kim | G06F 3/0412 |
| 2018/0120994 A1* | 5/2018 | Yoo | G06F 3/047 |
| 2018/0188860 A1* | 7/2018 | Yang | G06F 3/0412 |

* cited by examiner

DISPLAY PANEL, DISPLAY DEVICE AND DRIVING METHOD OF DISPLAY PANEL

CROSS-REFERENCE TO RELATED APPLICATIONS

This application claims priority to a Chinese patent application No. CN201710516499.5 filed on Jun. 29, 2017, the disclosure of which is incorporated herein by reference in its entirety.

TECHNICAL FIELD

Embodiments of the present disclosure relate to the technical field of displays, and particularly relate to a display panel, a display device and a driving method of the display panel.

BACKGROUND

Generally, an existing display panel is integrated with a touch function. The touch function is realized mainly by means of a touch electrode on the display panel. During a touch process, it is required to supply a touch driving signal to the touch electrode and read a touch sensing signal on the touch electrode.

However, outputting the touch driving signal and reading the touch sensing signal are generally controlled by a control integrated circuit (IC) on the display panel, and the cost of fabricating a control IC is high, because it takes 8-9 complex mask steps in a process of forming the display panel.

SUMMARY

The present disclosure provides a display panel, a display device and a driving method of the display panel, to apply a gate driving signal in control of writing and reading of the touch signal. Such a display panel and a display device have a simplified fabrication process.

Therefore, the cost is reduced.

In a first aspect, embodiments of the present disclosure provide a display panel, including: a plurality of touch electrodes; a plurality of control units; and a plurality of switching units.

One of the switching units and one of the control units are arranged to be associated with each other, and one of the switching units is associated with one of the touch electrodes.

Each of the control units has a first triggering signal input terminal and a second triggering signal input terminal, and different gate driving signals are input to the first triggering signal input terminal and the second triggering signal input terminal respectively, and each of the control units is configured to output a control signal to the associated one of the switching units according to the gate driving signals input to the first triggering signal input terminal and the second triggering signal input terminal.

Each of the switching units is configured to output a touch signal to the associated one of the touch electrodes according to the control signal.

In a second aspect, embodiments of the present disclosure further provide a display device, including the display panel provided by any embodiment of the present disclosure.

In a third aspect, embodiments of the present disclosure further provide a driving method of the display panel including: a plurality of touch electrode blocks arranged in an array, and the touch electrode blocks are multiplexed as common electrode blocks; a plurality of control units and a plurality of switching units. Each of the switching units and one of the control units are arranged to be associated with each other, and each of the switching units is associated with one of the touch electrodes.

Each of the control units has a first triggering signal input terminal, a second triggering signal input terminal and an output terminal, and the output terminal of the control unit is electrically connected with the control signal input terminal of the associated switching unit.

The driving method includes:
inputting different gate driving signals to the first triggering signal input terminal and the second triggering signal input terminal respectively, so as to control each of the control units to output a control signal; and
outputting, by each of the switching units, a touch signal or common voltage signal according to the control signal.

Through technical solutions supplied by embodiments of the present disclosure, the gate driving signal is supplied to the control units as the control signal, so as to output the touch signal. Therefore, no control IC is required to provide the control signal so as to output the touch signal, thereby saving cost and making control simple. Moreover, in a process of manufacturing the display panel, no additional mask is required to design the control IC, thereby saving the number of masks and technological steps and reducing production cost.

DETAILED DESCRIPTION

Figure 1:
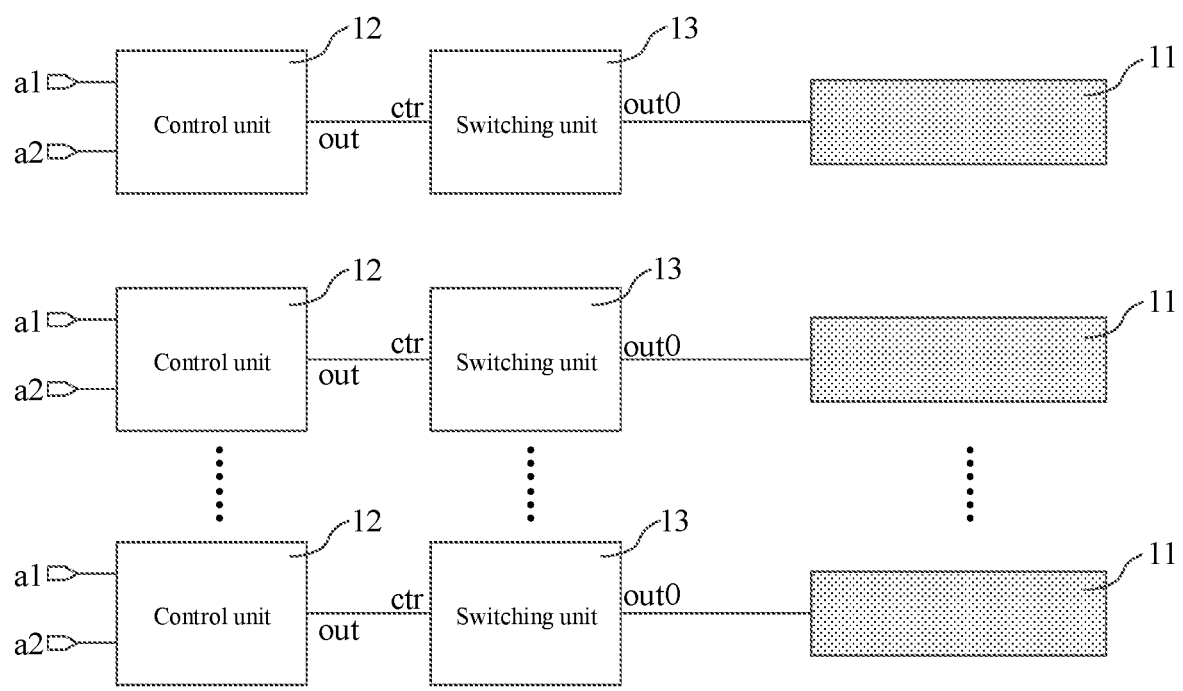
FIG. 1 is a structural schematic diagram illustrating a display panel provided by embodiments of the present disclosure.

The present disclosure is further described below in detail in combination with drawings and embodiments. It can be understood that specific embodiments described herein are only used for explaining the present disclosure, not limiting the present disclosure. It should also be noted that to facilitate the description, only structures relevant to the present disclosure rather than all the structures are shown in the drawings.

FIG. 1 is a structural schematic diagram illustrating a display panel provided by embodiments of the present disclosure. Referring to FIG. 1, the display panel includes a plurality of touch electrodes 11, a plurality of control units 12 and a plurality of switching units 13. Each switching unit 13 is arranged to be associated with one of the plurality of control units 12, and be associated with one of the plurality of touch electrodes 11.

Each control unit 12 has a first triggering signal input terminal "a1" and a second triggering signal input terminal "a2". The first triggering signal input terminal "a1" and the second triggering signal input terminal "a2" receive different gate driving signals, respectively. The control unit 12 is configured to output a control signal to a switching unit 13 associated with the control unit according to the gate driving signals input to the first triggering signal input terminal "a1" and the second triggering signal input terminal "a2".

The switching unit 13 is configured to output a touch signal to a touch electrode 11 associated with the switching unit according to the control signal.

It should be noted that, as exemplarily illustrated in FIG. 1, each control unit 12 is provided with an output terminal "out" configured to output the control signal, and each switching unit 13 is provided with a control signal input terminal "ctr" configured to receive the control signal. However, in other embodiments of the present disclosure, the control unit 12 may be provided with two output terminals. Accordingly, the switching unit 13 may be provided with two control signal input terminals.

Through embodiments of the present disclosure, the control unit 12 is configured to output the control signal to the switching unit 13 associated with the control unit according to the different gate driving signals input to the first triggering signal input terminal "a1" and the second triggering signal input terminal "a2" respectively. The switching unit 13 is configured to output the touch signal to the touch electrode 11 associated the switching unit according to the control signal. That is to say, the gate driving signals of the display panel can be used to perform control to output the control signal, so as to output the touch signal. Since no control IC is required to provide the control signal so as to perform a control to output the touch signal, the cost is reduced and the control is simple. Since no additional mask is required for designing the control IC, the number of mask technologies is less than 8, thereby saving the number of the mask technologies and technological steps and reducing the production cost. The gate driving signals are generally provided by a gate driving circuit, and are configured to activate pixels in the display panel row by row or column by column in a display procedure.

Figure 2A:
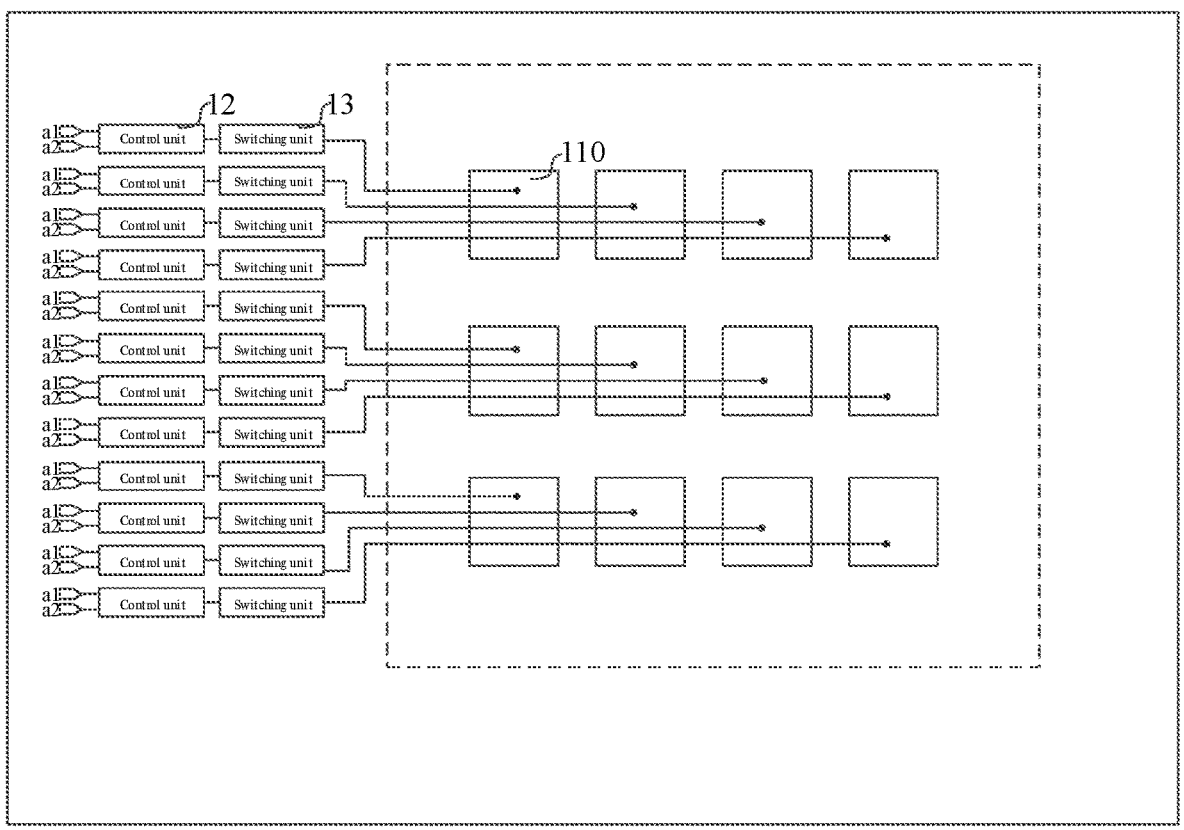
FIG. 2A is a structural schematic diagram illustrating another display panel provided by embodiments of the present disclosure.

FIG. 2A is a structural schematic diagram illustrating another display panel provided by embodiments of the present disclosure. Referring to FIG. 2A, based on the above embodiment, the touch electrode 11 is multiplexed as a common electrode. The touch electrode 11 includes a plurality of touch electrode blocks 110 arranged in an array. The switching unit 13 is further configured to output a common voltage signal to the touch electrode blocks 110 associated with the switching unit.

The control unit 12 is configured to, when the gate driving signal is input to the first triggering signal input terminal "a1", trigger and control the switching unit 13 to stop outputting the common voltage signal to the touch electrode blocks 110 associated with the switching unit, and switch to output the touch signal; and, when the gate driving signal is input to the second triggering signal input terminal "a2", trigger and control the switching unit 13 to stop outputting the touch signal to the touch electrode blocks 110 associated with the switching unit, and switch to output the common voltage signal. Specifically, when no gate driving signal is input to the first triggering signal input terminal "a1" of the control unit 12, the common voltage signal is output by the switching unit 13. In a phase of inputting the gate driving signal to the first triggering signal input terminal "a1", a first control signal, e.g., a high-level signal, is output from the control unit 12; and based on the first control signal, the switching unit 13 outputs the touch signal. In a phase of inputting the gate driving signal to the second triggering signal input terminal "a2", a second control signal, e.g., a low-level signal, is output from the control unit 12; and based on the second control signal, the switching unit 13 outputs the common voltage signal.

It should be noted that when the switching unit 13 switches to output the touch signal to the touch electrode blocks 110, the switching unit 13 can also read the touch signals on the touch electrode blocks 110 to determine a touch position. That is to say, the touch electrode blocks 110 in embodiments of the present disclosure may be used as not only touch driving electrode blocks but also touch sensing electrode blocks. In addition, in embodiments of the present disclosure, the number of rows and the number of columns of the array of the touch electrode blocks may be both greater than or equal to 2, but specific values of the number of rows and the number of columns are not limited, and are determined according to actual conditions.

Figure 2B:
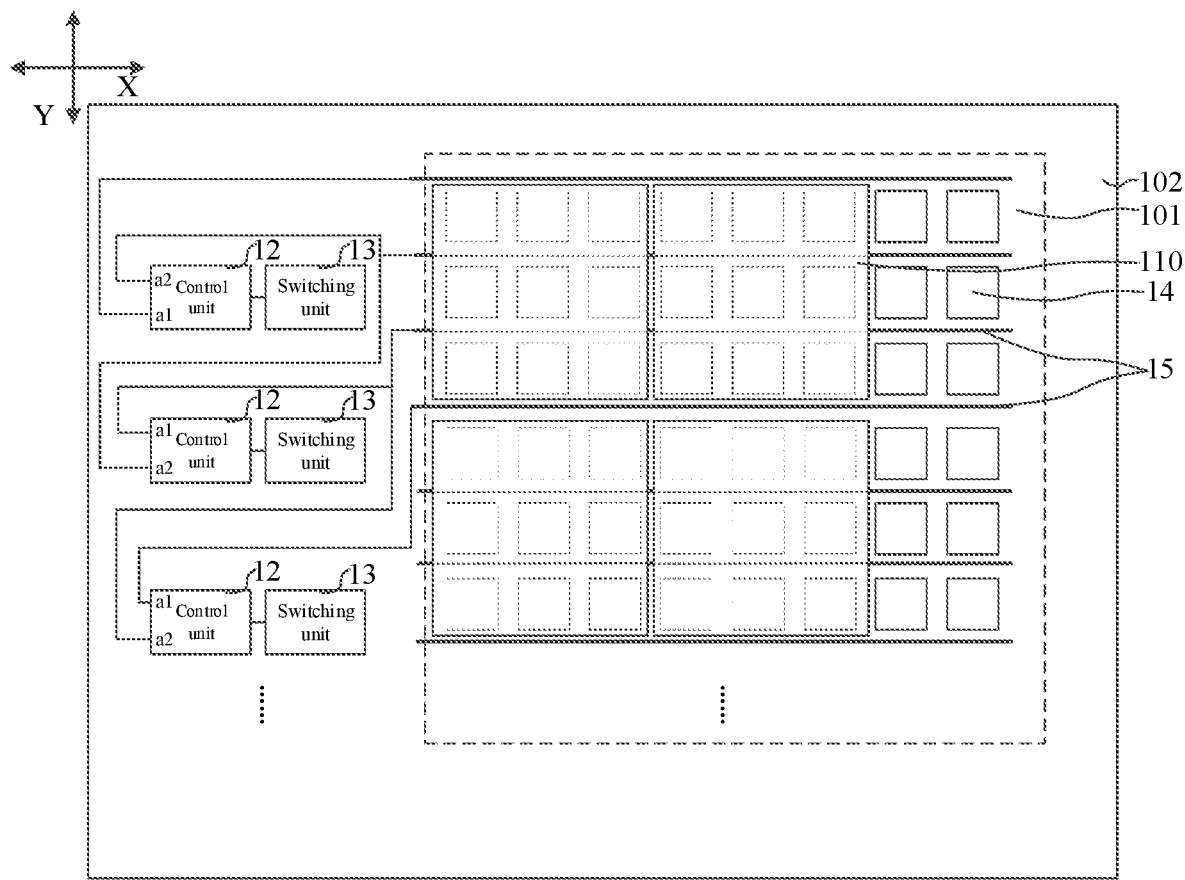
FIG. 2B is a structural schematic diagram illustrating another display panel provided by embodiments of the present disclosure.

FIG. 2B is a structural schematic diagram illustrating another display panel provided by embodiments of the present disclosure. Referring to FIG. 2B, based on the above embodiments, the display panel further includes a display region 101 and a non-display region 102. The control units 12 and the switching units 13 are located in the non-display region 102. The display panel further includes a plurality of pixel units 14 and a plurality of gate lines 15. The plurality of gate lines 15 extend along a first direction X, and are arranged along a second direction Y. The first direction X and the second direction Y intersect. The first direction X and the second direction Y may be perpendicular to each other. Along the second direction Y, the gate lines 15 are located in a region between two adjacent rows of the pixel units 14.

The first triggering signal input terminal "a1" of each control unit 12 is electrically connected with an associated different gate line 15 respectively. The first triggering signal input terminal "a1" and the second triggering signal input terminal "a2" of any control unit 12 are electrically connected with different gate lines 15 respectively. In an operation process of the display panel, the gate lines 15 are generally provided with the gate driving signals one line by one line. Specifically, the gate driving signals are provided to the gate lines 15 one line by one line through a gate driving circuit. Exemplarily, it is assumed that the first triggering signal input terminal "a1" of one control unit 12 is electrically connected with a first gate line 15, and the second triggering signal input terminal "a2" is electrically connected with a second gate line 15. In one frame, when a gate driving signal is output to the first gate line 15, the gate driving signal on the first gate line 15 is transmitted to the first triggering signal input terminal "a1" of the control unit 12 to trigger the control unit 12 to output the first control signal. Accordingly, the associated switching unit 13 electrically connected with the control unit 12 stops outputting the common voltage signal, and begins to output the touch signal. When a gate driving signal is output to a second gate line 15, the gate driving signal on the third gate line 15 is transmitted to the second triggering signal input terminal "a2" of the control unit 12 to trigger the control unit 12 to output the second control signal. Accordingly, the associated switching unit 13 electrically connected with the control unit 12 stops outputting the touch signal, and begins to output the common voltage signal.

It should be noted that the control unit 12 is triggered to output the first control signal by the gate driving signal input to the first triggering signal input terminal "a1" of the control unit 12. After receiving the first control signal at the control signal input terminal, the switching unit 13 stops outputting the common voltage signal and begins to output the touch signal. When the gate line 15 stops outputting the gate driving signal, the control unit 12 stops outputting the first control signal, and the switching unit 13 keeps outputting the touch signal until a gate driving signal is input to the second triggering signal input terminal "a2" of the control unit 12. The control unit 12 is triggered to output the second control signal by the gate driving signal input to the second triggering signal input terminal "a2" of the control unit 12. After receiving the second control signal at the control signal input terminal, the switching unit 13 stops outputting the touch signal, and begins to output the common voltage signal. When the gate line 15 stops outputting the gate driving signal, the control unit 12 stops outputting the second control signal, and the switching unit 13 keeps outputting the common voltage signal until a gate driving signal is input to the first triggering signal input terminal "a1" of the control unit 12.

In the display panel shown in FIG. 2B, the gate line electrically connected with the second triggering signal input terminal "a2" of one control unit 12 may also be electrically connected with the triggering signal input terminal "a1" of another control unit 12 next to the control unit 12.

Figure 2C:
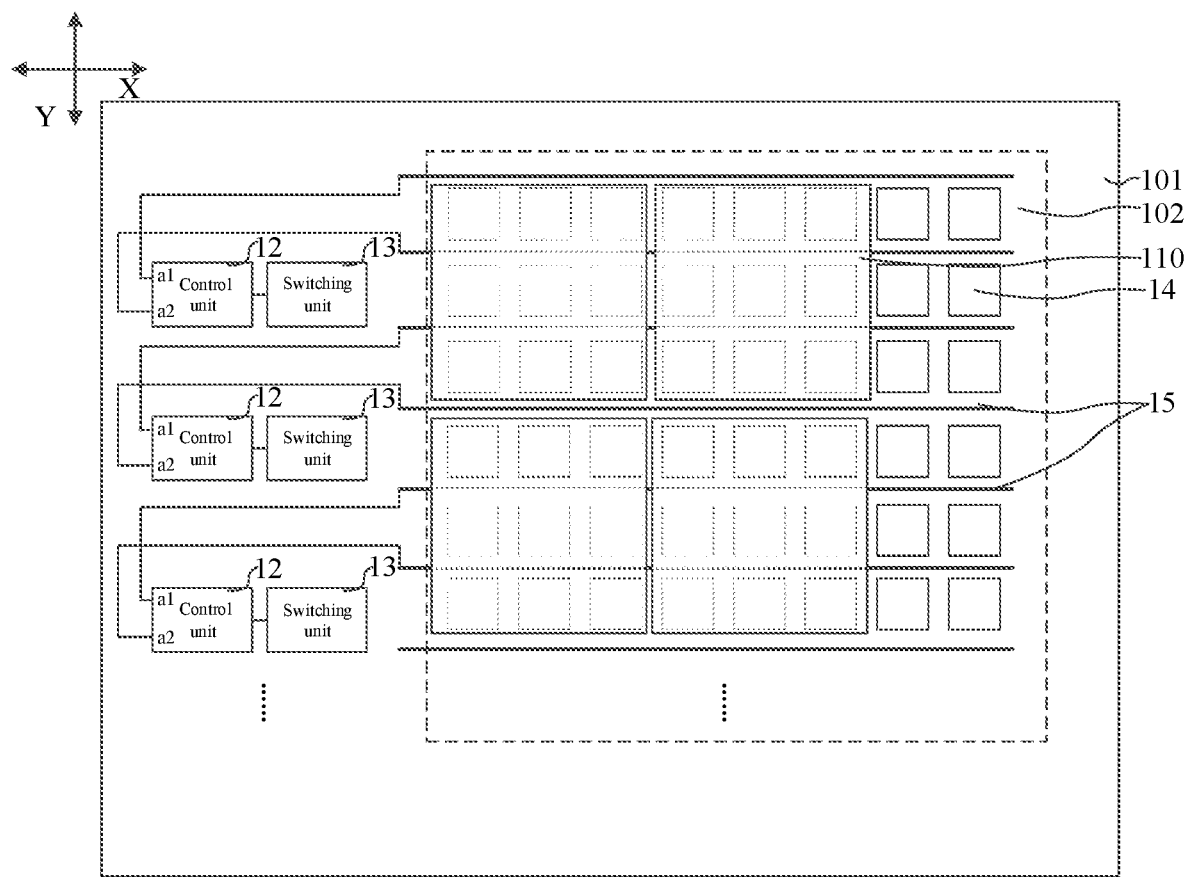
FIG. 2C is a structural schematic diagram illustrating another display panel provided by embodiments of the present disclosure.

FIG. 2C is a structural schematic diagram illustrating another display panel provided by embodiments of the present disclosure. Referring to FIG. 2C, in a touch process, each touch electrode block 110 needs to be individually driven. At the time of being used to driving display, the gate driving signal on the gate line 15 is simultaneously transmitted to the first triggering signal input terminal "a1" of the control unit 12 electrically connected with the gate line 15. Thus, the control unit 12 is driven to generate the control signal, and the switching unit 13 outputs the touch signal accordingly. If one gate line 15 is used to provide the gate driving signal to the first triggering signal input terminals "a1" of a plurality of control units 12, a driving capability may be insufficient and proper operation of the display panel is influenced. By electrically connecting the first triggering signal input terminal "a1" of each control unit 12 with the associated different gate line 15 and electrically connecting the second triggering signal input terminal "a2" of each control unit 12 with the associated different gate line 15, the driving capability of the control unit 12 can be enhanced, and the proper operation of the display panel is ensured. The switching unit 13 outputs the touch signal during a period from a time when the first gate driving signal is input to the first triggering signal input terminal "a1" of the associated control unit 12 to a time when the second gate driving signal is input to the second triggering signal input terminal "a2" of the associated control unit 12. The first triggering signal input terminal "a1" and the second triggering signal input terminal "a2" of the control unit 12 are electrically connected with different gate lines 15 respectively.

Optionally, the gate line 15 electrically connected with the control unit 12 which is associated with the switching unit 13 associated with any row of the touch electrode blocks 110, is not covered by this row of the touch electrode blocks 110. In other words, the gate line 15 and the touch electrode blocks 110 do not intersect along a direction perpendicular to a plane of the touch electrode blocks 110. When the gate line 15 provides the gate driving signal, the switching unit 13 associated with the control unit 12 which is electrically connected with the gate line 15 outputs the touch signal to the associated touch electrode blocks 110. If the touch electrode blocks 110, to which the touch signal is output, cover the gate line 15 on which the gate driving signal is output, the interference will be generated, and the display and/or touch of the display panel are affected. Since the gate line 15 electrically connected with the control unit 12 which is associated with the switching unit 13 associated with any row of touch electrode blocks 110 is not covered by the row of touch electrode blocks 110, the interference between the touch electrode blocks 110 and the gate line 15 is reduced and the proper operation of the display panel is ensured.

Figure 2D:
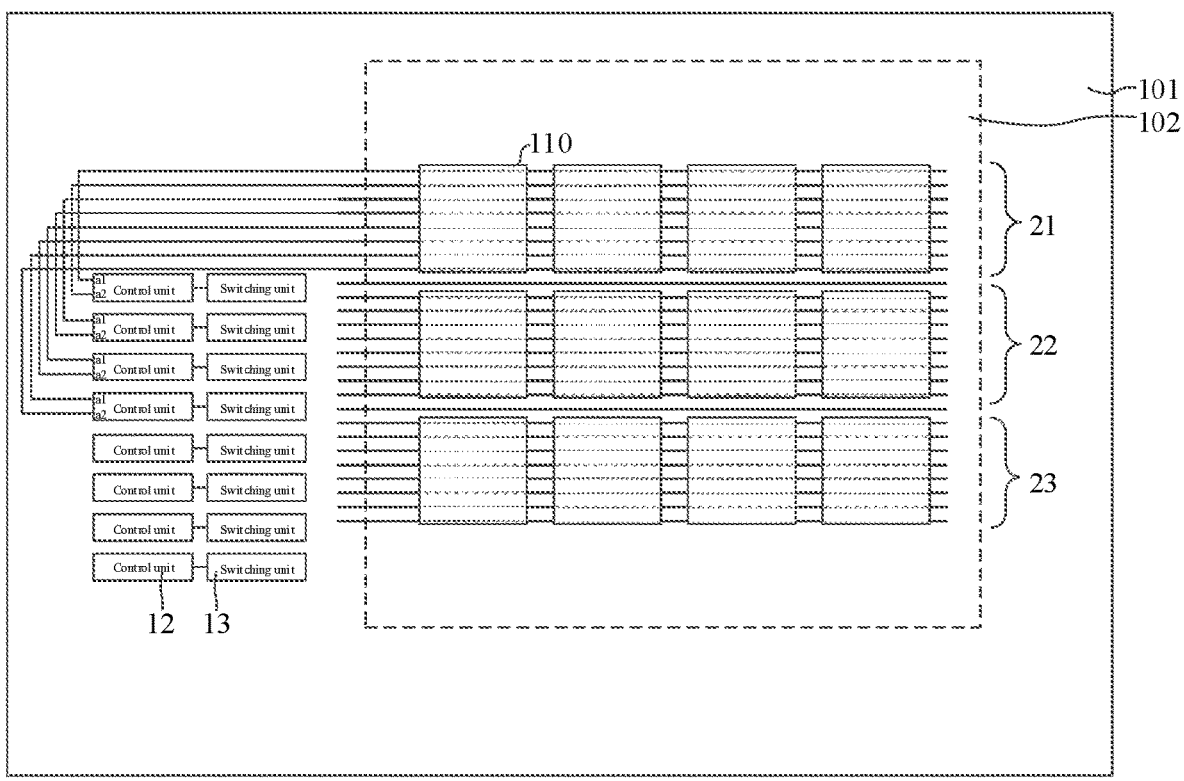
FIG. 2D is a structural schematic diagram illustrating another display panel provided by embodiments of the present disclosure.

Further, the display panel provided by embodiments of the present disclosure may include n rows of touch electrode blocks. The control unit which is associated with the switching unit associated with one row of a second row to an nth row of touch electrode blocks, is electrically connected with the gate line covered by the previous row of touch electrode blocks; and, the control unit which is associated with the switching unit associated with the first row of touch electrode blocks, is electrically connected with the gate line covered by the nth row of touch electrode blocks. Alternatively, the control unit which is associated with the switching unit associated with one row of the first row to the (n−1)th row of touch electrode blocks, is electrically connected with the gate line covered by the next row of touch electrode blocks; and the control unit which is associated with the switching unit associated with the nth row of touch electrode blocks, is electrically connected with the gate line covered by the first row of touch electrode blocks, where n is a positive integer. Referring to FIG. 2D, FIG. 2D is a structural schematic diagram illustrating another display panel provided by embodiments of the present disclosure. The control unit 12 which is associated with the switching unit 13 associated with the nth row of touch electrode blocks 110, is electrically connected with the gate line 15 covered by the last row of touch electrode blocks 110; and each control unit 12 which is associated with the switching unit 13 associated with other row of touch electrode blocks 110 other than the first row of touch electrode blocks, is electrically connected with the gate line 15 covered by an adjacent row of touch electrode blocks 110. Alternatively, the control unit 12 which is associated with the switching unit 13 associated with the last (nth) row of touch electrode blocks 110, is electrically connected with the gate line 15 covered by the first row of the touch electrode blocks 110; and each control unit 12 which is associated with the switching unit 13 associated with to other row of touch electrode blocks 110 other than the last row, is electrically connected with the gate line 15 covered by an adjacent row of touch electrode blocks 110. For example, the control unit 12 associated with the second row of touch electrode blocks (22) is electrically connected with the gate line 15 covered by the first row of touch electrode blocks (21). The control unit 12 associated with the third row of touch electrode blocks (23) is electrically connected with the gate line 15 covered by the second row of touch electrode blocks (22). Therefore, a wiring distance is shorter while the interference is reduced, and thus loss can be further reduced.

Figure 3A:
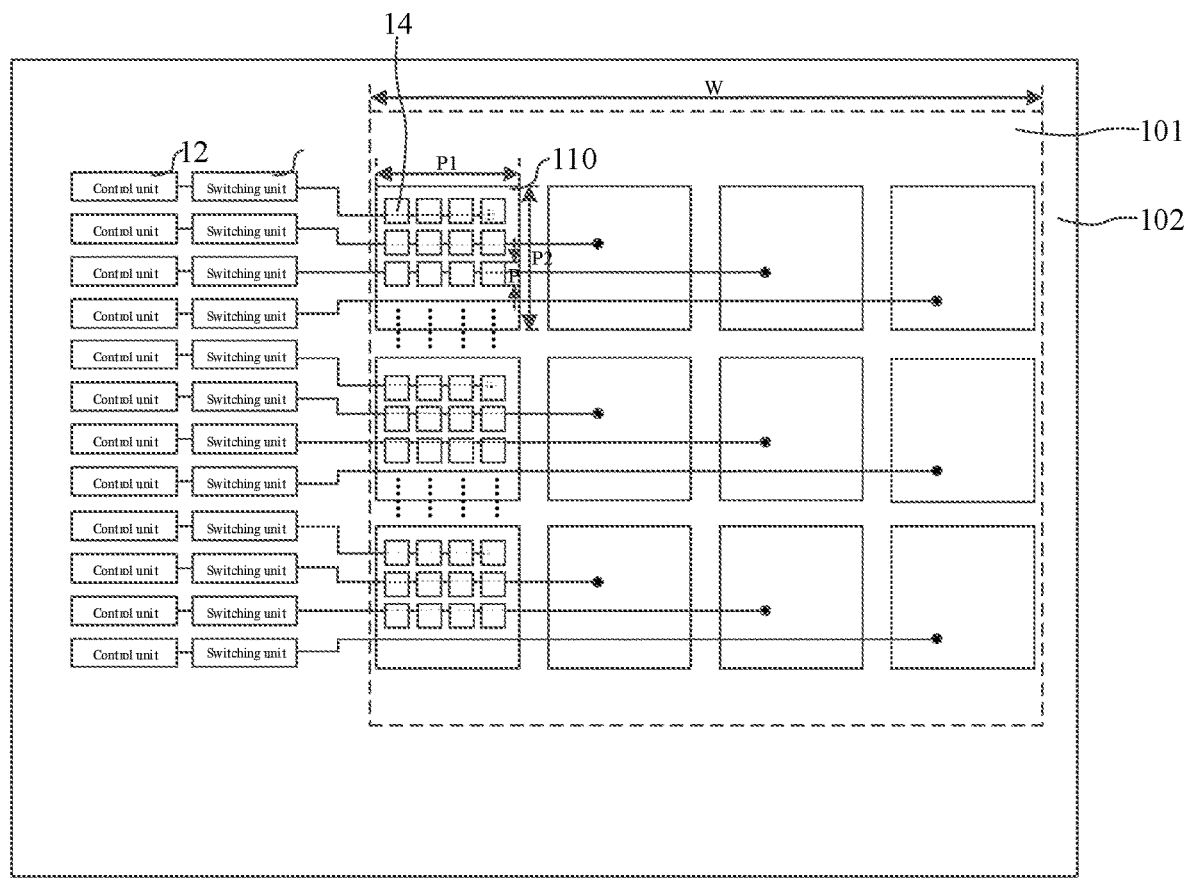
FIG. 3A is a structural schematic diagram illustrating another display panel provided by embodiments of the present disclosure.

FIG. 3A is a structural schematic diagram illustrating another display panel provided by embodiments of the present disclosure. Referring to FIG. 3A, each touch electrode block 110 is electrically connected with an associated one of the switching unit 13, and the control unit 12 and the switching unit 13 are arranged at one side of the display region 101. It can be seen that the control unit 12 and the switching unit 13 are arranged at one side of the display region 101. The width of the display region 101 along the first direction X is W, and the length of the pixel units 14 along the second direction Y is P. The width of the touch electrode blocks 110 along the first direction X is P1, and the length of the touch electrode blocks 110 along the second direction Y is P2, where $P1 \geq \sqrt{PW}$ and $P2 \geq \sqrt{PW}$.

In the display panel, the number of the pixel units 14 is generally much larger than the number of the touch electrode blocks 110, and one touch electrode block 110 is associated with a plurality of pixel units 14. When the gate driving signals are output to the control units 12 which is associated with the switching units 13 associated with X touch electrode blocks 110 in one row, at least X gate lines are needed, while one row of pixel units 14 generally corresponds to one gate line. That is to say, each touch electrode block 110 is associated with at least X pixel units 14 along the second direction Y. Therefore, X needs to satisfy: $X \leq P2/P$, where $X=W/P1$. Assuming $P1 \approx P2$, then $P1 \approx P2 \geq \sqrt{PW}$.

Figure 3B:
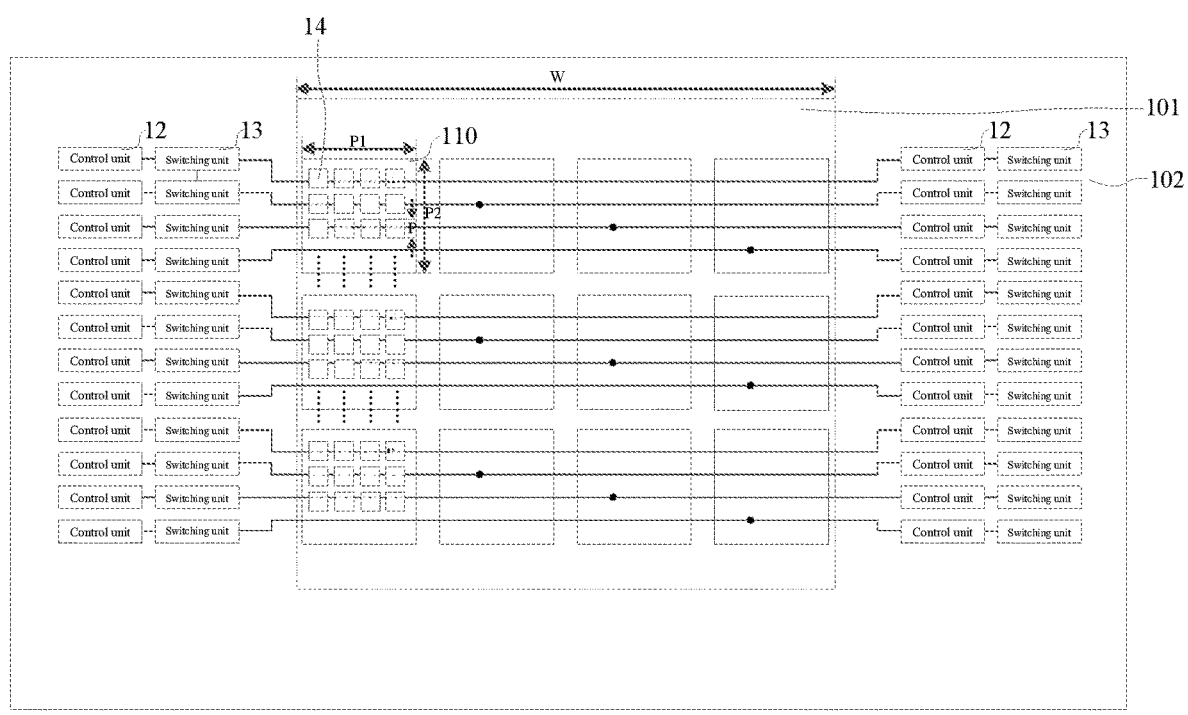
FIG. 3B is a structural schematic diagram illustrating another display panel provided by embodiments of the present disclosure.

FIG. 3B is a structural schematic diagram illustrating another display panel provided by embodiments of the present disclosure. Referring to FIG. 3B, each touch electrode block 110 is electrically connected with two associated switching units 13, which are located at one side of the display region 101 respectively. The control units 12 electrically connected with the switching units 13 are located at the same side as the switching units 13. The width of the display region 101 along the first direction X is W, and the length of the pixel unit 14 along the second direction Y is P. The width of the touch electrode block 110 along the first direction X is P1, and the length of the touch electrode block 110 along the second direction Y is P2, where $P1 \geq \sqrt{2PW}$ and $P2 \geq \sqrt{2PW}$.

The display panel can firstly scan the odd-numbered rows of gate lines 15, and then scan the even-numbered rows of gate lines 15, or firstly scan the even-numbered rows of gate lines 15, and then scan the odd-numbered rows of gate lines 15. Each touch electrode block 110 is electrically connected with two associated control units 12 which is associated with two switching units 13, which are electrically connected with the odd-numbered rows of gate lines 15 and the even-numbered rows of gate lines 15 respectively. The control unit 12 located at the left side is electrically connected with the odd-numbered row of gate line 15, and the control unit 12 located at the right side is electrically connected with the even-numbered row of gate line 15. Alternatively, the control unit 12 located at the left side is electrically connected with the even-numbered row of gate line 15, and the control unit 12 located at the right side is electrically connected with the odd-numbered row of gate line 15. When display scan of one frame is realized, touch scan of two frames can be realized. The number of touch electrode blocks 110 in one row is X. X needs to satisfy: $X \leq P2/2P$, where $X=W/P1$. Assuming $P1 \approx P2$, then $P1 \approx P2 \geq \sqrt{2PW}$.

Figure 3C:
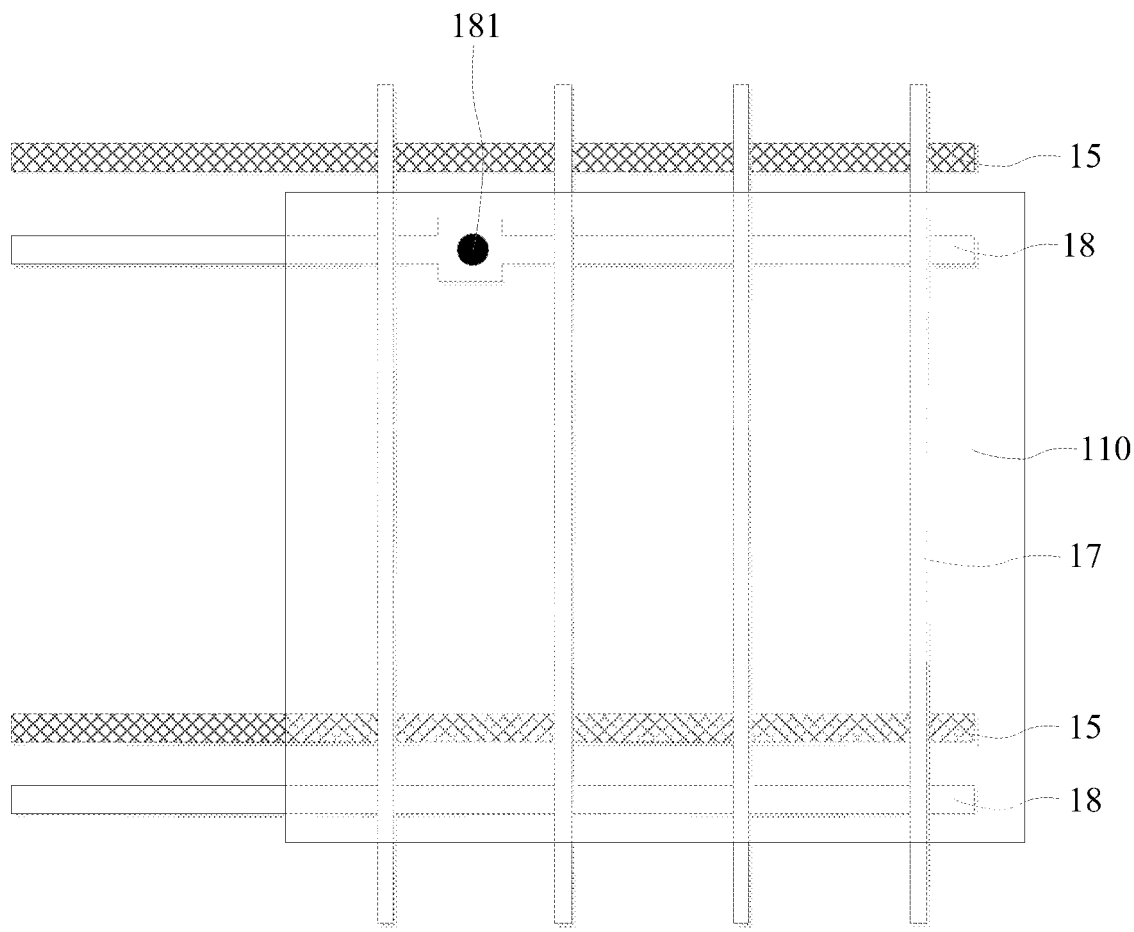
FIG. 3C is a structural schematic diagram illustrating another display panel provided by embodiments of the present disclosure.

Referring to FIG. 3C, FIG. 3C is a structural schematic diagram illustrating another display panel provided by embodiments of the present disclosure. Referring to FIG. 3C, the display panel provided by the embodiments of the present disclosure further includes a plurality of data signal lines 17. The plurality of data signal lines 17 extend along the second direction Y, and are arranged along the first direction X. The data signal lines 17 and the gate lines 15 intersect and are insulated from each other to limit a plurality of sub pixels (the sub pixels are not shown in the figures). Each of the above pixel units generally includes a plurality of sub pixels. For example, each pixel unit may include three sub pixels, i.e., a red sub pixel, a green sub pixel and a blue sub pixel. Alternatively, each pixel unit may include four sub pixels, i.e., a red sub pixel, a green sub pixel, a blue sub pixel and a white sub pixel. Each sub pixel includes a pixel electrode and a common electrode. The pixel electrode is connected with one data signal line 17 through a thin film transistor (not shown in the figure), and the sub pixel is configured to emit light to display in response to a driving signal between the pixel electrode and the common electrode. The common electrode may be a common electrode block which is multiplexed as the touch electrode block 110. When the gate line 15 is charged, i.e., a gate driving signal is applied to the gate line 15, the thin film transistor is turned on and the data signals on the data signal line 17 charges the pixel electrode to display. Meanwhile, the gate driving signal on the gate line 15 is supplied to the control unit 12, and then the touch signal is generated to drive the touch electrode blocks 110 so as to realize touching. The touch electrode block 110 is electrically connected with the output terminal of the switching unit 13 through touch wires 18. For example, the touch electrode block 110 is electrically connected with the touch wire 18 through a via hole 181. Since the gate lines 15 provide the gate driving signals to the control units 12 and the switching units 13 associated with the control units 12 charge the touch wires 18, the control units 12 and its associated switching units 13 are generally arranged adjacently. The gate lines 15 and the touch wires 18 both extend along the first direction X, and may be arranged on a same layer and formed in a same technology, thereby reducing masks and technological steps. As for a liquid crystal display panel, an electric field formed between the pixel electrodes and the common electrode drives liquid crystals to rotate to realize display of the sub pixels. As for an organic light emitting display panel, an organic light emitting diode may have an anode thereof as a pixel electrode and have a cathode thereof as a common electrode. An electron transmission layer, a light emitting layer and a hole transportation layer are successively arranged between the cathode and the anode. by A bias voltage is applied between the anode and the cathode to form a current so as to realize the display of the sub pixel.

Figure 4A:
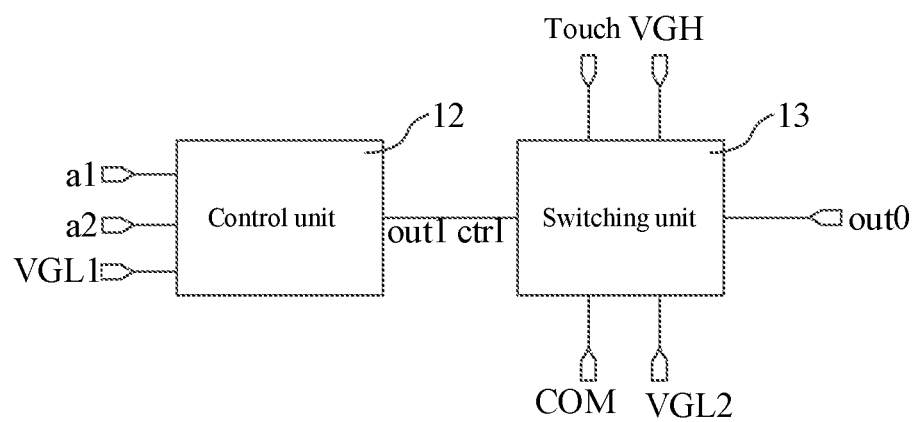
FIG. 4A is a circuit block diagram of a control unit and a switching unit provided by embodiments of the present disclosure.

FIG. 4A is a structural schematic diagram illustrating a control unit and a switching unit provided by embodiments of the present disclosure. The control unit and the switching unit may be configured in the display panel supplied any embodiment of the present disclosure. Referring to FIG. 4A, the control unit 12 includes a first triggering signal input terminal "a1", a second triggering signal input terminal "a2", a first level signal input terminal "VGL1" and a first output terminal "out1". The switching unit 13 includes a first control signal input terminal "ctrl1", a touch signal input terminal "Touch", a common voltage signal input terminal "COM", a second level signal input terminal "VGL2", a third level signal input terminal "VGH" and an output terminal "out0".

The first control signal input terminal "ctrl1" of the switching unit 13 is electrically connected with the first output terminal "out1" of the control unit 12, and the output terminal of the switching unit 13 is electrically connected with the touch electrode block associated with the switching unit.

Figure 4B:
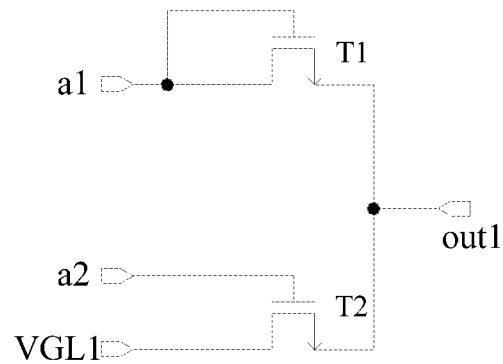
FIG. 4B is a circuit diagram of a control unit provided by embodiments of the present disclosure.
Figure 4C:
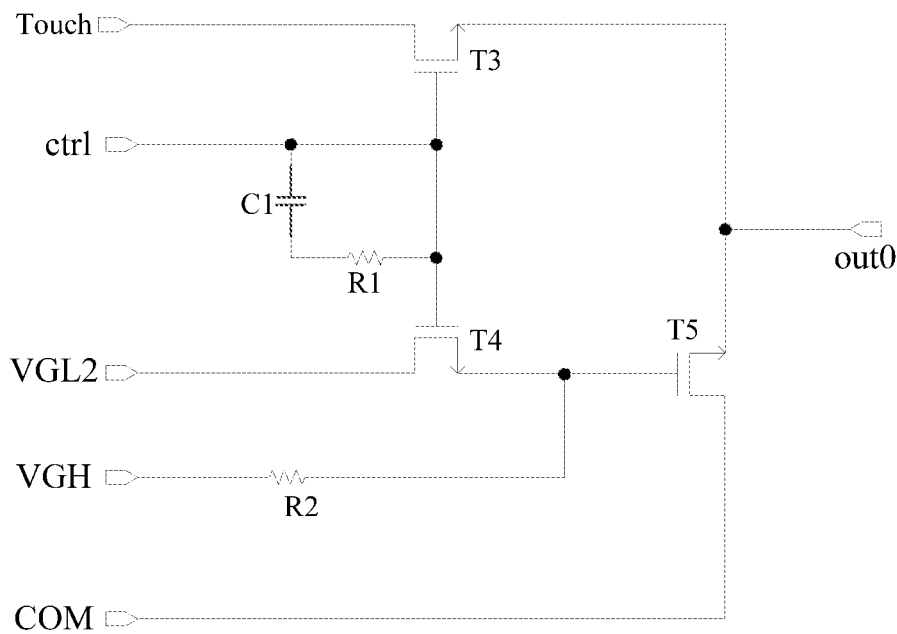
FIG. 4C is a circuit diagram of a switching unit provided by embodiments of the present disclosure.

FIG. 4B is a circuit diagram of a control unit provided by embodiments of the present disclosure. Referring to FIG. 4B, based on the circuit shown in FIG. 4A, the control unit includes a first transistor T1 and a second transistor T2. A gate and a first electrode of the first transistor T1 are electrically connected with the first triggering signal input terminal "a1", and a second electrode of the first transistor T1 is electrically connected with the output terminal "out1" of the control unit. A gate of the second transistor T2 is electrically connected with the second triggering signal input terminal "a2", a first electrode of the second transistor T2 is electrically connected with the first level signal input terminal "VGL1" of the control unit, and a second electrode of the second transistor T2 is electrically connected with the first output terminal "out1" of the control unit. FIG. 4C is a circuit diagram of a switching unit provided by embodiments of the present disclosure. Referring to FIG. 4C, based on the circuit shown in FIG. 4A, the switching unit 13 includes a third transistor T3, a fourth transistor T4, a fifth transistor T5, a first resistor R1, a second resistor R2 and a first capacitor C1. A gate of the third transistor T3 is electrically connected with the first control signal input terminal "ctrl1" of the switching unit 13, a first electrode of the third transistor T3 is electrically connected with the touch signal input terminal "Touch" of the switching unit 13, and a second electrode of the third transistor T3 is electrically connected with the output terminal "out0" of the switching unit 13. A gate of the fourth transistor T4 is electrically connected with the first control signal input terminal "ctrl1" of the switching unit 13, a first electrode of the fourth transistor T4 is electrically connected with the second level signal input terminal "VGL2", and a second electrode of the fourth transistor T4 is electrically connected with a gate of the fifth transistor T5. A first electrode of the fifth transistor T5 is electrically connected with the common voltage signal input terminal "COM", and a second electrode of the fifth transistor T5 is electrically connected with the output terminal "out0" of the switching unit 13. A first electrode of the first capacitor C1 is electrically connected with the gate of the third transistor T3, and a second electrode of the first capacitor C1 is electrically connected with one end of the first resistor R1. The other end of the first resistor R1 is electrically connected with the gate of the fourth transistor T4. One end of the second resistor R2 is electrically connected with the gate of the fifth transistor T5, and a second end of the second resistor R2 is electrically connected with the third level signal input terminal "VGH".

Figure 4D:
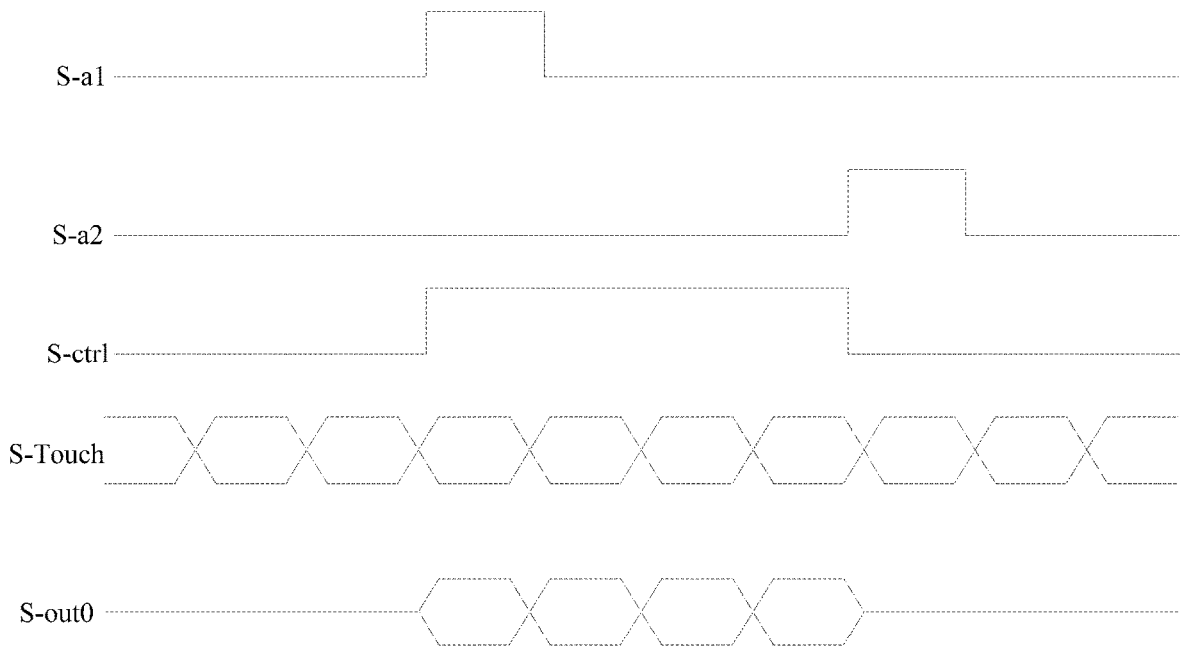
FIG. 4D is a driving sequence chart provided by embodiments of the present disclosure.

FIG. 4D is a driving sequence chart provided by embodiments of the present disclosure. Specific operation processes of the control unit circuit and the switching unit circuit provided by embodiments of the present disclosure are exemplarily illustrated below in combination with FIG. 4A, FIG. 4B, FIG. 4C and FIG. 4D. "S-a1" indicates a gate driving signal input to the first triggering signal input terminal "a1" of the control unit, and "S-a2" indicates a gate driving signal input to the second triggering signal input terminal "a2" of the control unit. "S-ctrl1" indicates a signal input to the first control signal input terminal "ctrl1" of the switching unit, and "S-Touch" indicates a signal input to the touch signal input terminal "Touch" of the switching unit. "S-out0" indicates a signal output from the output terminal "out0" of the switching unit. Each transistor is an N type transistor. Low-level signals are input to the first level signal input terminal "VGL1" and the second level signal input terminal "VGL2". The signals input to the first level signal input terminal "VGL1" and the second level signal input terminal "VGL2" may be the same. A high-level signal is input to the third level signal input terminal "VGH".

When a gate driving signal is input to the first triggering signal input terminal "a1" of the control unit and no gate driving signal is input to the second triggering signal input terminal "a2" (it can be understood that a constant level signal is input; for example, a constant low-level signal is input), the first transistor T1 is turned on, and the second transistor T2 is turned off. Thus, the high-level signal input to the first triggering signal input terminal "a1" of the control unit is transmitted to the gate of the third transistor T3. Meanwhile, the first electrode of the first capacitor C1 stores the high-level signal, and supplies the high-level signal to the gate of the third transistor T3 continually. Accordingly, the third transistor T3 is turned on. The touch signal input to the touch signal input terminal "Touch" is transmitted to the output terminal "out0" of the switching unit through the third transistor T3 being turned on, that is, the switching unit outputs the touch signal. The high-level signal is also input to the gate of the fourth transistor T4, so as to drive the fourth transistor T4 to be turned on. Thus, the low-level signal input to the second level signal input terminal "VGL2" is transmitted to the gate of the fifth transistor T5. As a result, the fifth transistor T5 is turned off.

When a gate driving signal is input to the second triggering signal input terminal "a2" of the control unit and no gate driving signal is input to the first triggering signal input terminal "a1", the first transistor T1 is turned off, and the second transistor T2 is turned on. Thus, the low-level signal input to the first level signal input terminal "VGL1" is transmitted to the gates of the third transistor T3 and the fourth transistor T4. Meanwhile, the first electrode of the first capacitor C1 stores the low-level signal, and supplies the low-level signal to the gate of the third transistor T3 and the gate of the fourth transistor T4 continually. Accordingly, the third transistor T3 and the fourth transistor T4 are turned off. The high-level signal is input to the gate of the fifth transistor T5, so as to drive the fifth transistor T5 to be turned on. Therefore, the common voltage signal is output from the output terminal "out0" of the switching unit. It can be seen that in embodiments of the present disclosure, the control unit is configured to output the control signal based on the gate driving signal, the control signal output from the control unit is used to control the switching unit to output the touch signal or the common voltage signal, and the control circuit is simple.

Figure 4E:
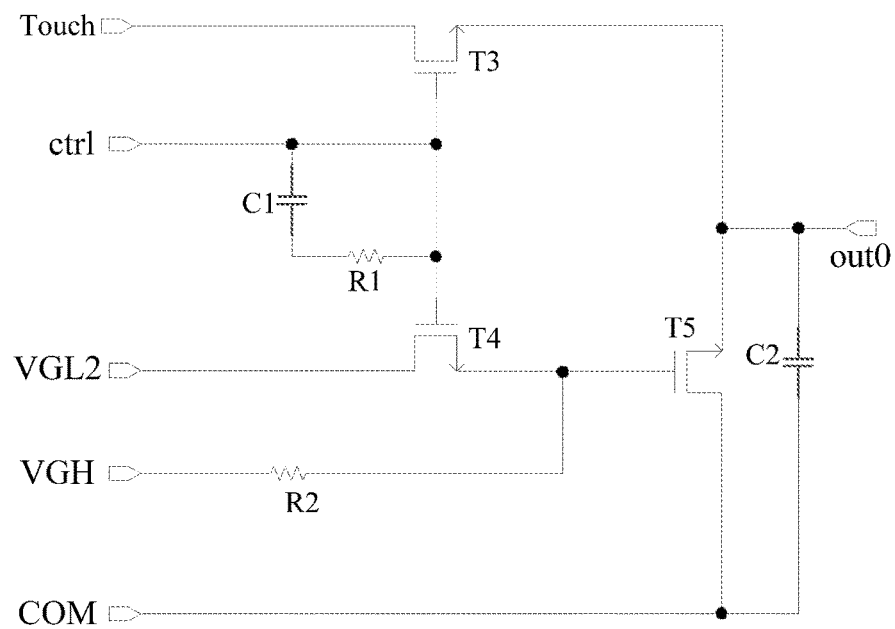
FIG. 4E is a circuit diagram of another switching unit provided by embodiments of the present disclosure.

FIG. 4E is a circuit diagram of another switching unit provided by embodiments of the present disclosure. Referring to FIG. 4E, the switching unit further includes a second capacitor C2. A first electrode of the second capacitor C2 is electrically connected with the common voltage signal input terminal "COM", and a second electrode of the second capacitor C2 is electrically connected with the output terminal "out0" of the switching unit. The second capacitor C2 mainly relates to parasitic capacitance generated in the circuit.

Figure 4F:
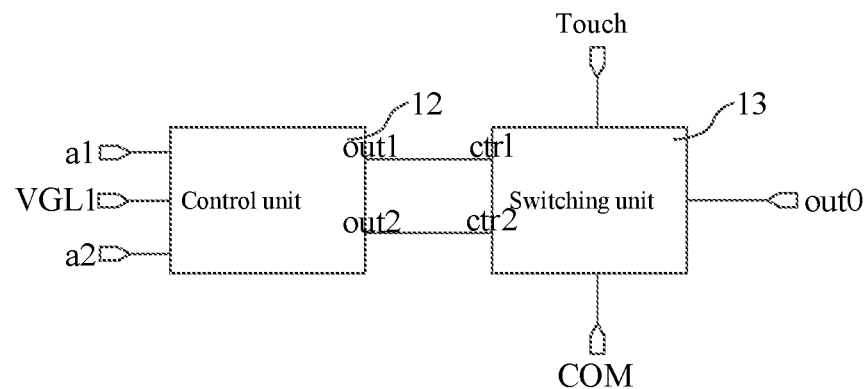
FIG. 4F is a circuit block diagram of another control unit and switching unit provided by embodiments of the present disclosure.

FIG. 4F is a circuit block diagram of another control unit and switching unit provided by embodiments of the present disclosure. Referring to FIG. 4F, the control unit 12 includes a first triggering signal input terminal "a1", a second triggering signal input terminal "a2", a first level signal input terminal "VGL1", a first output terminal "out1" and a second output terminal "out2". The switching unit 13 includes: a first control signal input terminal "ctr1", a second control signal input terminal "ctr2", a touch signal input terminal "Touch", a common voltage signal input terminal "COM" and an output terminal "out0".

The first control signal input terminal "ctr1" of the switching unit 13 is electrically connected with the first output terminal "out1" of the control unit. The second control signal input terminal "ctr2" of the switching unit 13 is electrically connected with the second output terminal "out2" of the control unit 12. The output terminal "out0" of the switching unit 13 is electrically connected with the touch electrode block associated with the switching unit.

Figure 4G:
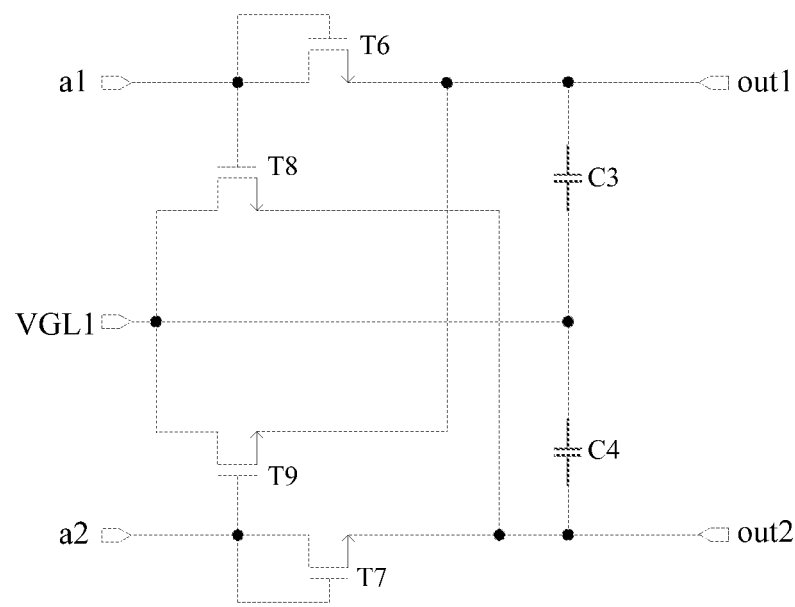
FIG. 4G is a circuit diagram of another control unit provided by embodiments of the present disclosure.

FIG. 4G is a circuit diagram of a control unit provided by embodiments of the present disclosure. Referring to FIG. 4G based on the circuit shown in FIG. 4F, the control unit further includes a sixth transistor T6, a seventh transistor T7, an eighth transistor T8, a ninth transistor T9, a third capacitor C3 and a fourth capacitor C4.

The gate and the first electrode of the sixth transistor T6 are electrically connected with the first triggering signal input terminal "a1", and the second electrode of the sixth transistor T6 is electrically connected with the first electrode of the third capacitor C3.

The gate and the first electrode of the seventh transistor T7 are electrically connected with the second triggering signal input terminal "a2", and the second electrode of the seventh transistor T7 is electrically connected with the first electrode of the fourth capacitor C4.

The gate of the eighth transistor T8 is electrically connected with the gate of the sixth transistor T6. The first electrode of the eighth transistor T8 is electrically connected with the first level signal input terminal "VGL1". The second electrode of the eighth transistor T8 is electrically connected with the first electrode of the fourth capacitor C4.

The gate of the ninth transistor T9 is electrically connected with the gate of the seventh transistor T7. The first electrode of the ninth transistor T9 is electrically connected with the first level signal input terminal "VGL1". The second electrode of the ninth transistor T9 is electrically connected with the first electrode of the third capacitor C3.

The first electrode of the third capacitor C3 is electrically connected with the first output terminal "out1" of the control unit, and the second electrode of the third capacitor C3 is electrically connected with the first level signal input terminal "VGL1".

The first electrode of the fourth capacitor C4 is electrically connected with the second output terminal "out2" of the control unit, and the second electrode of the fourth capacitor C4 is electrically connected with the first level signal input terminal "VGL1".

Figure 4H:
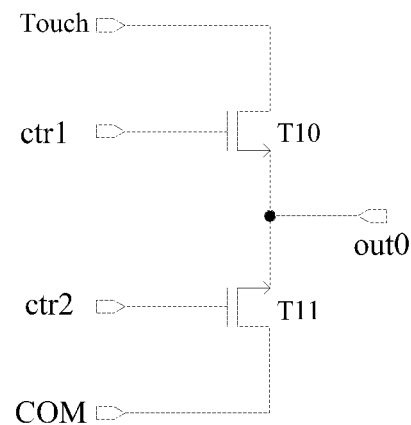
FIG. 4H is a circuit diagram of another switching unit provided by embodiments of the present disclosure.

FIG. 4H is a circuit diagram of a switching unit provided by embodiments of the present disclosure. Referring to FIG. 4H, based on the circuit shown in FIG. 4F, the switching unit further includes a tenth transistor T10 and an eleventh transistor T11.

The gate of the tenth transistor T10 is electrically connected with the first control signal input terminal "ctr1" of the switching unit. The first electrode of the tenth transistor T10 is electrically connected with the touch signal input terminal "Touch". The second electrode of the tenth transistor T10 is electrically connected with the output terminal "out0" of the switching unit.

The gate of the eleventh transistor T11 is electrically connected with the second control signal input terminal "ctr2". The first electrode of the eleventh transistor T11 is electrically connected with the common voltage signal input terminal. The second electrode of the eleventh transistor T11 is electrically connected with the output terminal "out0" of the switching unit.

Figure 4I:
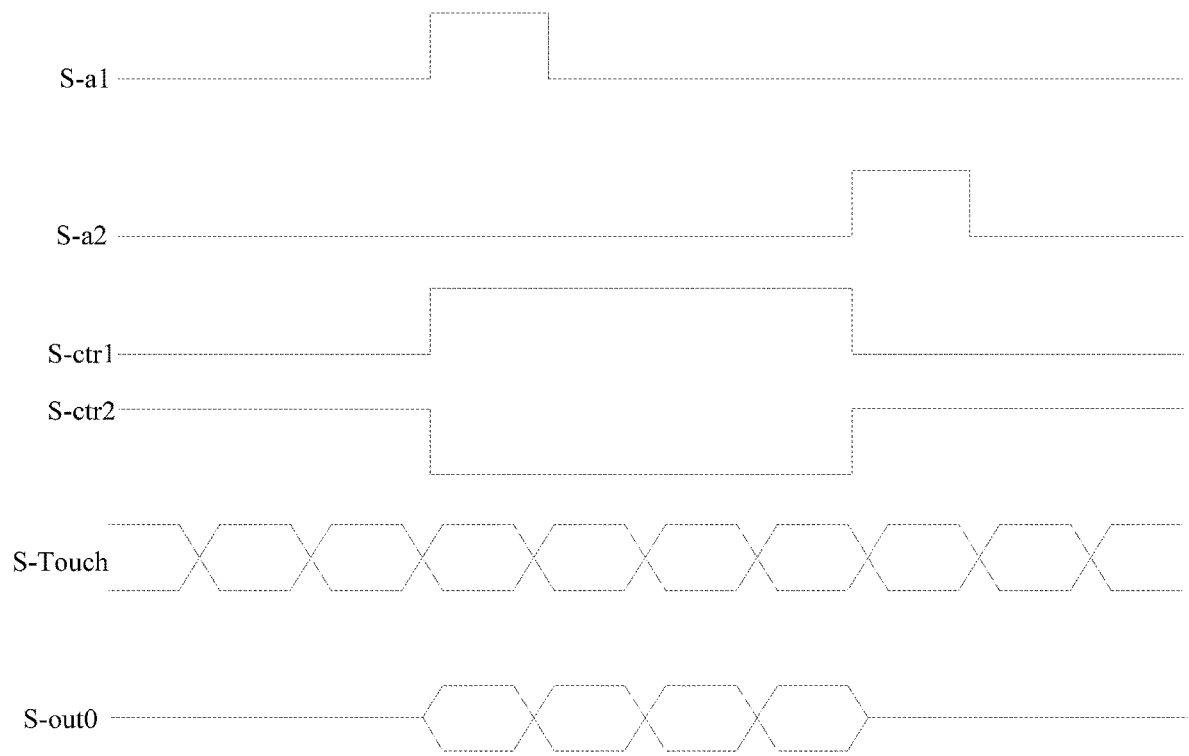
FIG. 4I is another driving sequence chart provided by embodiments of the present disclosure.

FIG. 4I is a driving sequence chart provided by embodiments of the present disclosure. Specific operation processes of a control unit circuit and a switching unit circuit provided by embodiments of the present disclosure are exemplarily illustrated below in combination with FIG. 4F, FIG. 4G FIG. 4H and FIG. 4I. "S-a1" indicates a gate driving signal input to the first triggering signal input terminal "a1" of the control unit, and "S-a2" indicates a gate driving signal input to the second triggering signal input terminal "a2" of the control unit. "S-ctr1" indicates a signal input to the first control signal input terminal "ctr1" of the switching unit, and "S-ctr2" indicates a signal input to the second control signal input terminal "ctr2" of the switching unit. "S-Touch" indicates a signal input to the touch signal input terminal "Touch" of the switching unit. "S-out0" indicates a signal output from the output terminal "out0" of the switching unit. Each transistor is an N type transistor. Low-level signal is input to the first level signal input terminal "VGL1".

When a gate driving signal is input to the first triggering signal input terminal "a1" of the control unit and no gate driving signal is input to the second triggering signal input terminal "a2" (it can be understood that a constant level signal is input; for example, a constant low-level signal is input), the sixth transistor T6 and the eighth transistor T8 are turned on, and the seventh transistor T7 and the ninth transistor T9 are turned off. Thus, the high-level signal input to the first triggering signal input terminal "a1" of the control unit is transmitted to the first electrode of the third capacitor C3, i.e., the first output terminal "out1" of the control unit. That is to say, the first output terminal "out1" of the control unit outputs a high-level signal. Meanwhile, the first electrode of the third capacitor C3 stores the high-level signal, and supplies the high-level signal to the first output terminal "out1" of the control unit continually. Since the eighth transistor T8 is turned on, the low-level signal input to the first level signal input terminal is transmitted to the first electrode of the fourth capacitor C4, i.e., transmitted to the second output terminal "out2" of the control unit. That is to say, the second output terminal "out2" of the control unit outputs a low-level signal. Meanwhile, the first electrode of the fourth capacitor C4 stores the low-level signal, and supplies the low-level signal to the second output terminal "out2" of the control unit continually. As a result, a high-level signal is input to the first control signal input terminal "ctr1" of the switching unit, so that the tenth transistor T10 is turned on. A low-level signal is input to the second control signal input terminal, so that the eleventh transistor T11 is turned off. Thus, the touch signal input to the touch signal input terminal is written to the output terminal "out0" of the switching unit through the tenth transistor T10 being turned on. That is to say, the output terminal "out0" of the switching unit outputs the touch signal.

When a gate driving signal is input to the second triggering signal input terminal "a2" of the control unit and no gate driving signal is input to the first triggering signal input terminal "a1", the seventh transistor T7 and the ninth transistor T9 are turned on, and the sixth transistor T6 and the eighth transistor T8 are turned off. Thus, the high-level signal input to the second triggering signal input terminal "a2" of the control unit is transmitted to the first electrode of the fourth capacitor C4, i.e., transmitted to the second output terminal "out2" of the control unit. That is to say, the second output terminal "out2" of the control unit outputs the high-level signal. Meanwhile, the first electrode of the fourth capacitor C4 stores the high-level signal, and supplies the high-level signal to the second output terminal "out2" of the control unit continually. Since the ninth transistor T9 is turned on, the low-level signal input to the first level signal input terminal "VGL1" is transmitted to the first electrode of the third capacitor C3, i.e., transmitted to the first output terminal "out1" of the control unit. That is to say, the first output terminal "out1" of the control unit outputs the low-level signal. Meanwhile, the first electrode of the third capacitor C3 stores the low-level signal, and supplies the low-level signal to the first output terminal "out1" of the control unit continually. Accordingly, a low-level signal is input to the first control signal input terminal "ctr1" of the switching unit, so that the tenth transistor T10 is turned off. A high-level signal is input to the second control signal input terminal "ctr2", so that the eleventh transistor T11 is turned on. Thus, the common voltage signal input to the common voltage signal input terminal "COM" is written to the output terminal "out0" of the switching unit through the eleventh transistor T11 being turned on. That is to say, the common voltage signal is output from the output terminal "out0" of the switching unit. It can be seen that in embodiments of the present disclosure, the control unit is configured to output the control signal based on the gate driving signal, and then the switching unit is controlled to output the touch signal or the common voltage signal according to the control signal output from the control unit. Therefore, the control circuits are simple.

Figure 5:
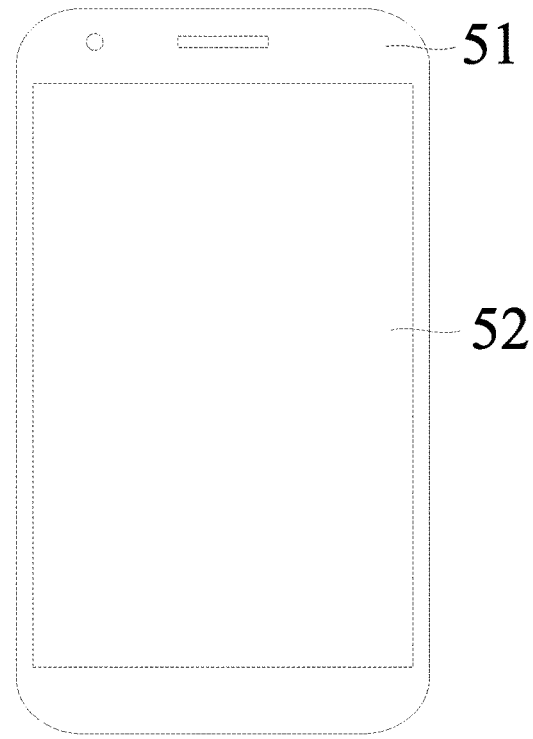
FIG. 5 is a schematic diagram illustrating a display device provided by embodiments of the present disclosure.
Figure 6:
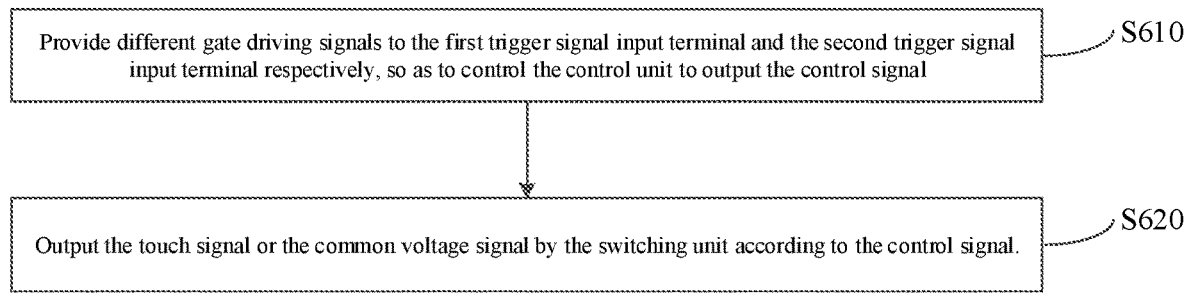
FIG. 6 is a flow chart illustrating a driving method of a display panel provided by embodiments of the present disclosure.

Embodiments of the present disclosure further provide a display device. Referring to FIG. 5, FIG. 5 is a schematic diagram illustrating a display device provided by embodiments of the present disclosure. The display device 51 includes the display panel 52 provided in any embodiment of the present disclosure.

Embodiments of the present disclosure further provide a driving method of a display panel. The display panel includes: a plurality of touch electrode blocks arranged in an array; a plurality of control units and a plurality of switching units. The touch electrode blocks are multiplexed as common electrode blocks. Each switching unit is arranged to be associated with one control unit, and each switching unit is associated with one touch electrode.

Each control unit includes a first triggering signal input terminal, a second triggering signal input terminal and an output terminal. The output terminal of the control unit is electrically connected with a control signal input terminal of the switching unit associated with the control unit.

The driving method includes steps described below.

In S610, different gate driving signals are respectively input to the first triggering signal input terminal and the second triggering signal input terminal, so as to control the control unit to output a control signal.

In S620, the switching unit outputs a touch signal or a common voltage signal according to the control signal.

The control unit is configured to output the control signal according to the different gate driving signals input to the first triggering signal input terminal and the second triggering signal input terminal. The switching unit is configured to output the touch signal to the touch electrode according to the control signal input to the control signal input terminal.

The above driving method may be used to drive the display panel provided by any embodiment of the present disclosure.

Exemplarily, Referring to FIG. 2C again, the display panel further includes a display region 101 and a non-display region 102. The control units 12 and the switching units 13 are located in the non-display region 102.

The display panel further includes a plurality of pixel units 14 and a plurality of gate lines 15. The plurality of gate lines 15 extend along a first direction X, and are arranged along a second direction Y. The first direction X and the second direction Y intersect. Along the second direction Y, each gate line 15 is located in a region between two adjacent rows of pixel units 14.

The first triggering signal input terminal "a1" of each control unit 12 is electrically connected with different gate lines 15 respectively. The first triggering signal input terminal "a1" and the second triggering signal input terminal "a2" of any of the control units 12 are electrically connected with different gate lines respectively.

In the driving method, when different gate driving signals are output to each gate line 15, for example, when different gate driving signals are output to each gate line 15 through the gate driving circuit, the gate driving signals on the gate lines 15 are input to the first triggering signal input terminal "a1" and the second triggering signal input terminal "a2" of the control unit 12. Different gate driving signals are input to the first triggering signal input terminal "a1" and the second triggering signal input terminal "a2" of the control unit 12, so that the control unit 12 outputs a control signal.

The switching unit 13 outputs the touch signal or common voltage signal according to the control signal output from the control unit 12.

Specifically, if a gate driving signal is input to the first triggering signal input terminal of the control unit, the switching unit is triggered and controlled by the control unit to stop outputting the common voltage signal and output the touch signal simultaneously. If a gate driving signal is input to the second triggering signal input terminal of the control unit, the switching unit is triggered and controlled to stop outputting the touch signal and output the common voltage signal simultaneously.

Referring to FIG. 3A again, each touch electrode block 110 is electrically connected with an associated switching unit 13, and the control units 12 and the switching units 13 are located at one side of the display region.

In one frame displayed, the gate lines 15 output the gate driving signals one by one to successively drive each control unit 12 to output the control signal, thereby controlling the switching unit 13 associated with the control unit to output the touch signal to each touch electrode block 110.

The control units 12 are electrically connected with the gate lines 15. Thus, when the gate lines 15 successively output the gate driving signals, the control units 12 successively output the control signals and the switching units 13 associated with these control units also output the touch signals successively, thereby realizing a touch function of the display panel. That is, when one frame for display scanning is finished, one frame for touch scanning is also finished.

Referring to FIG. 3B again, each touch electrode block 110 is electrically connected with two associated switching units 13, and the two associated switching units 13 are located at two sides of the display region 101 respectively.

In one frame displayed, odd-numbered rows of gate lines 15 output the gate driving signals successively to drive the control units 12 to successively output the control signals, thereby controlling the associated switching units 13 to output the touch signals to each touch electrode block 110.

Even-numbered rows of the gate lines 15 output the gate driving signals successively to drive the control units 12 to output the control signals successively, thereby controlling the associated switching units 13 to output the touch signals to each touch electrode block 110.

For example, the first triggering signal input terminal "a1" and the second triggering signal input terminal "a2" of the control units 12 located at one side of the display region 101 may be electrically connected with the odd-numbered rows of gate lines 15, and the first triggering signal input terminal "a1" and the second triggering signal input terminal "a2" of the control units 12 located at the other side of the display region 101 may be electrically connected with the even-numbered rows of gate lines 15. When the scan of the odd-numbered rows of gate lines 15 is finished, the scan driving of all the touch electrode blocks 110 is realized, and when the scan of the even-numbered rows of gate lines 15 is finished, the scan driving of all the touch electrode blocks 110 is also realized, i.e., the touch scan of two frames is realized in the display scan of one frame.

It should be noted that the above contents are only preferred embodiments of the present disclosure and used technical principles. It can be understood for those skilled in the art that the present disclosure is not limited to specific embodiments described herein. For those skilled in the art, the present disclosure can be subjected to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A display panel, comprising:
a plurality of touch electrodes;
a plurality of control units; and
a plurality of switching units,
wherein the plurality of switching units each and one of the plurality of control units are arranged to be associated with each other, and wherein the plurality of switching units each is associated with one of the plurality of touch electrodes;
wherein the plurality of control units each has a first triggering signal input terminal and a second triggering signal input terminal, and different gate driving signals are input to the first triggering signal input terminal and the second triggering signal input terminal respectively, wherein the plurality of control units each is configured to output a control signal to an associated one of the plurality of switching units according to the gate driving signals input to the first triggering signal input terminal and the second triggering signal input terminal; and
wherein the plurality of switching units each is configured to output a touch signal to an associated one of the plurality of touch electrodes according to the control signal;
wherein the plurality of touch electrodes are multiplexed as common electrodes, and the plurality of touch electrodes each comprises touch electrode blocks; and wherein the plurality of switching units each is further configured to output a common voltage signal to an associated one of the touch electrode blocks;
wherein the plurality of control units each is configured to trigger and control said switching units, when the gate driving signal is input to the first triggering signal input terminal, to stop outputting the common voltage signal to the associated one of the touch electrode blocks, and switch to output the touch signal, and when the gate driving signal is input to the second triggering signal input terminal, to stop outputting the touch signal to the associated one of the touch electrode blocks, and to switch to output the common voltage signal;
wherein the display panel further comprises:
a display region and a non-display region, wherein the plurality of control units and the switching units are located in the non-display region;
a plurality of pixel units and a plurality of gate lines, wherein the plurality of gate lines extends along a first direction, and is arranged along a second direction intersecting with the first direction; wherein along the second direction, each of the plurality of gate lines is located in a region between two adjacent rows of pixel units;
wherein the first triggering signal input terminal of each of the plurality of control units is electrically connected with a different one of the plurality of gate lines respectively, and wherein the first triggering signal input terminal and the second triggering signal input terminal of any of the plurality of control units are electrically connected with different gate lines respectively; and
wherein the plurality of gate lines electrically connected with the plurality of control units which control the switching units associated with a row of touch electrode blocks, is not covered by said row of the touch electrode blocks.

2. The display panel according to claim 1, wherein the display panel comprises n rows of touch electrode blocks, the n rows of touch electrode blocks are electrically connected with the gate lines in one of the following manners:
wherein the control unit, which is associated with the switching unit associated with one of a second row to an nth row of touch electrode blocks, is electrically connected with the gate lines covered by a previous row of touch electrode blocks, and the control unit, which is associated with the switching unit associated with a first row of touch electrode blocks, is electrically connected with the gate lines covered by the nth row of touch electrode blocks; and wherein the control unit, which is associated with the switching unit associated with one of the first row to an (n−1)th row of touch electrode blocks, is electrically connected with the gate lines covered by a next row of touch electrode blocks, and the control unit, which is associated with the switching unit associated with the nth row of touch electrode blocks, is electrically connected with the gate lines covered by the first row of touch electrode blocks, wherein n is a positive integer.

3. The display panel according to claim 1, wherein each of the touch electrode blocks is electrically connected with an associated one of the plurality of switching units, and the plurality of control units and the switching units are located at one side of the display region;
wherein a width of the display region along the first direction is W, and a length of each of the pixel units along the second direction is P; and
a width of each of the touch electrode blocks along the first direction is P1, and a length of each of the touch electrode blocks along the second direction is P2, wherein $P1 \geq \sqrt{PW}$ and $P2 \geq \sqrt{PW}$.

4. The display panel according to claim 1, wherein each of the touch electrode blocks is electrically connected with the associated two of the switching units, and the associated two switching units are located at two sides of the display region respectively;
wherein a width of the display region along the first direction is W, and a length of each of the pixel units along the second direction is P; and
wherein a width of each of the touch electrode blocks along the first direction is P1, and a length of each of the touch electrode blocks along the second direction is P2,
wherein $P1 \geq \sqrt{2PW}$ and $P2 \geq \sqrt{2PW}$.

5. The display panel according to claim 1, wherein the plurality of control units each further has a first level signal input terminal, a first output terminal and a second output terminal; and the plurality of switching units each further has a first control signal input terminal, a second control signal input terminal, a touch signal input terminal, a common voltage signal input terminal and an output terminal;
wherein the first control signal input terminal of said switching unit is electrically connected with the first output terminal of the control unit, the second control signal input terminal of the switching unit is electrically connected with the second output terminal of the control unit, and the output terminal of said switching unit is electrically connected with the touch electrode block associated with said switch unit.

6. The display panel according to claim 5, wherein the plurality of control units each further comprises a sixth transistor, a seventh transistor, an eighth transistor, a ninth transistor, a third capacitor and a fourth capacitor;
wherein a gate and a first electrode of the sixth transistor are electrically connected with the first triggering signal input terminal, and a second electrode of the sixth transistor is electrically connected with a first electrode of the third capacitor;
wherein a gate and a first electrode of the seventh transistor are electrically connected with the second triggering signal input terminal, and a second electrode of the seventh capacitor is electrically connected with a first electrode of the fourth capacitor;
wherein a gate of the eighth transistor is electrically connected with the gate of the sixth transistor, a first electrode of the eighth transistor is electrically connected with the first level signal input terminal, and a second electrode of the eighth transistor is electrically connected with the first electrode of the fourth capacitor;
wherein a gate of the ninth transistor is electrically connected with the gate of the seventh transistor, a first electrode of the ninth transistor is electrically connected with the first level signal input terminal, and a second electrode of the ninth transistor is electrically connected with the first electrode of the third capacitor;
wherein the first electrode of the third capacitor is electrically connected with the first output terminal of the control unit, and a second electrode of the third capacitor is electrically connected with the first level signal input terminal; and
wherein the first electrode of the fourth capacitor is electrically connected with the second output terminal of the control unit, and a second electrode of the fourth capacitor is electrically connected with the first level signal input terminal.

7. The display panel according to claim 5, wherein the plurality of switching units each further comprises a tenth transistor and an eleventh transistor;
wherein a gate of the tenth transistor is electrically connected with the first control signal input terminal, a first electrode of the tenth transistor is electrically connected with the touch signal input terminal, and a second electrode of the tenth transistor is electrically connected with the output terminal of the switching unit; and
wherein a gate of the eleventh transistor is electrically connected with the second control signal input terminal, a first electrode of the eleventh transistor is electrically connected with the common voltage signal input terminal, and a second electrode of the eleventh transistor is electrically connected with the output terminal of the switching unit.

8. A display device comprising a display panel, wherein the display panel comprises:
a plurality of touch electrodes;
a plurality of control units; and
a plurality of switching units,
wherein the plurality of switching units each and one of the control units are arranged to be associated with each other, and the plurality of switching units each is associated with one of the touch electrodes;
wherein the plurality of control units each has a first triggering signal input terminal and a second triggering signal input terminal, and different gate driving signals are input to the first triggering signal input terminal and the second triggering signal input terminal respectively, wherein the plurality of control units each are configured to output a control signal to an associated one of the plurality of switching units according to the gate driving signals input to the first triggering signal input terminal and the second triggering signal input terminal; and
wherein the plurality of switching units each is configured to output a touch signal to an associated one of the plurality of touch electrodes according to the control signal;
wherein the plurality of touch electrodes are multiplexed as common electrodes, and the plurality of touch electrodes each comprises touch electrode blocks; wherein the plurality of switching units each is further configured to output a common voltage signal to an associated one of the touch electrode blocks;

wherein when the gate driving signal is input to the first triggering signal input terminal, the plurality of control units each is configured to trigger and control said switching unit, to stop outputting the common voltage signal to the associated one of the touch electrode blocks, and to switch to output the touch signal, and when the gate driving signal is input to the second triggering signal input terminal, to stop outputting the touch signal to the associated one of the touch electrode blocks, and to switch to output the common voltage signal;

wherein the display panel further comprises:

a display region and a non-display region, wherein the control units and the switching units are located in the non-display region;

a plurality of pixel units and a plurality of gate lines, wherein the plurality of gate lines extends along a first direction, and is arranged along a second direction intersecting with the first direction; wherein along the second direction, each of the gate lines is located in a region between two adjacent rows of the pixel units;

wherein the first triggering signal input terminal of each of the plurality of control units is electrically connected with a different one of the plurality of gate lines respectively, and the first triggering signal input terminal and the second triggering signal input terminal of one of the plurality of control units are electrically connected with different ones of the plurality of gate lines respectively; and wherein each of the plurality of gate lines electrically connected with one of the plurality of control units, which controls the switching unit associated with one row of touch electrode blocks, is not covered by said row of touch electrode blocks.

9. A driving method of a display panel, wherein the display panel comprises:

a plurality of touch electrode blocks arranged in an array, wherein the plurality of touch electrode blocks is multiplexed as common electrode blocks;

a plurality of control units; and a plurality of switching units, wherein the plurality of switching units each and one of the control units are arranged to be associated with each other, and the plurality of switching units each is associated with one of the plurality of touch electrode blocks;

wherein the plurality of control units each has a first triggering signal input terminal, a second triggering signal input terminal and an output terminal, and the output terminal of the control unit is electrically connected with a control signal input terminal of an associated one of the plurality of switching units;

wherein the display panel further comprises, a display region and a non-display region, wherein the plurality of control units and the plurality of switching units are located in the non-display region;

a plurality of pixel units and a plurality of gate lines, wherein the plurality of gate lines extends along a first direction, and are arranged along a second direction intersecting with the first direction; along the second direction, each of the gate lines is located in a region between two adjacent rows of pixel units;

wherein the driving method comprises:

inputting different gate driving signals to the first triggering signal input terminal and the second triggering signal input terminal respectively, so as to control the plurality of control units to output a control signal;

wherein the first triggering signal input terminal of each of the control units is electrically connected with different plurality of gate lines respectively, and wherein the first triggering signal input terminal and the second triggering signal input terminal of any of the control units are electrically connected with different gate lines respectively; and a gate driving signal on each of the gate lines drives one of the plurality of control units to output the control signal;

outputting, by the plurality of switching units, a touch signal or a common voltage signal according to the control signal;

wherein when the gate driving signal is input to the first triggering signal input terminal, the plurality of control units each is configured to trigger and control the plurality of switching units, to stop outputting the common voltage signal and switch to output the touch signal; and wherein when the gate driving signal is input to the second triggering signal input terminal, the plurality of control units each is configured to trigger and control the plurality of switching units, to stop outputting the touch signal and switch to output the common voltage signal; and wherein the plurality of gate lines, electrically connected with the plurality of control units which controls the plurality of switching units associated with one row of touch electrode blocks, is not covered by said row of the touch electrode blocks.

10. The driving method according to claim 9, wherein the plurality of touch electrode blocks each is electrically connected with the associated one of the plurality of switching units, and the plurality of control units and the plurality of switching units are located at one side of the display region; wherein in one frame being displayed, the gate lines output the gate driving signals one by one to successively drive the control units to output the control signals, so as to control the associated switching units to output the touch signals to one of the touch electrode blocks.

11. The driving method according to claim 9, wherein each of the touch electrode blocks is electrically connected with the associated two of the switching units, and the associated two switching units are located at two sides of the display region respectively;

wherein in one frame being displayed, odd-numbered rows of the plurality of gate lines output the gate driving signals one by one to successively drive the plurality of control units to output the control signals, so as to control the associated switching units to output the touch signals to each of the touch electrode blocks; and wherein even-numbered rows of the plurality of gate lines output the gate driving signals one by one to successively drive the plurality of control units to output the control signals, so as to control the associated switching units to output the touch signals to one of the touch electrode blocks.

* * * * *